US012731974B2

(12) United States Patent
Groleau et al.

(10) Patent No.: US 12,731,974 B2
(45) Date of Patent: Sep. 8, 2026

(54) ASSEMBLY AND METHOD FOR SUPPORTING A CABLE

(71) Applicant: BIZLINK ELOCAB LTD., Kitchener (CA)

(72) Inventors: Scott Groleau, Kitchener (CA); Manish Patel, Kitchener (CA)

(73) Assignee: BIZLINK ECOLAB LTD., Kitchener (CA)

(*) Notice: Subject to any disclaimer, the term of this patent is extended or adjusted under 35 U.S.C. 154(b) by 2 days.

(21) Appl. No.: 18/682,161

(22) PCT Filed: Sep. 29, 2021

(86) PCT No.: PCT/CA2021/051362
§ 371 (c)(1),
(2) Date: Feb. 8, 2024

(87) PCT Pub. No.: WO2023/049986
PCT Pub. Date: Apr. 6, 2023

(65) Prior Publication Data
US 2024/0266818 A1 Aug. 8, 2024

(51) Int. Cl.
*H02G 11/00* (2006.01)
*F16G 13/16* (2006.01)
*H02G 3/04* (2006.01)

(52) U.S. Cl.
CPC ........... *H02G 11/006* (2013.01); *F16G 13/16* (2013.01); *H02G 3/0475* (2013.01)

(58) Field of Classification Search
CPC .. H02G 11/006; H02G 3/0475; H02G 3/0418; H02G 3/0437; H02G 11/00; F16G 13/16
(Continued)

(56) References Cited

U.S. PATENT DOCUMENTS 378,561 A * 2/1888 Waring ................ H02G 3/0418 174/101
659,550 A * 10/1900 Robertson ................ B60M 1/34 174/99 R (Continued)

FOREIGN PATENT DOCUMENTS

CN 1413372 A * 4/2003 ........... H02G 11/006
CN 102449867 A * 5/2012 ........... H02G 11/006

(Continued)

OTHER PUBLICATIONS

Machine translation of KR 20120060527 (Year: 2012).*
Machine translation of KR 20190089526 (Year: 2019).*
Extended European Search Report—PCT/CA2021051362—Apr. 30, 2025.

*Primary Examiner* — Taylor Morris
(74) *Attorney, Agent, or Firm* — Tucker Ellis LLP

(57) ABSTRACT

An assembly (200) for supporting a cable including a first piece (300) having a first hole (305), and a second piece (400) having a second hole (405). The first hole (305) and the second hole (405) are configured to be aligned with one another. The first hole (305) and the second hole (405) are configured to accept a screw (205) and/or a nut for securely coupling the first piece (300) and the second piece (400) to one another. The second piece (400) further includes a protrusion (415) configured to interact with at least a section of the first piece (300). The protrusion (415) and the section of the first piece (300) are configured to temporarily couple the first piece (300) and the second piece (400) to one another before the screw (205) is inserted into the first hole (305) and the second hole (405).

15 Claims, 5 Drawing Sheets

(58) Field of Classification Search
USPC ........................................ 248/68.1; 138/120
See application file for complete search history.

(56) References Cited

U.S. PATENT DOCUMENTS 926,148 A * 6/1909 Sullivan ............... H02G 3/0437 439/806
2,975,807 A * 3/1961 Waninger ............. H02G 11/006 138/120
3,060,972 A * 10/1962 Sheldon ............... A61B 1/0055 138/120
3,351,699 A * 11/1967 Merckle ............... H02G 3/0418 174/101
3,454,115 A * 7/1969 Cifelli ...................... H02G 3/02 174/101
3,504,097 A * 3/1970 Carlson .................... H02G 5/06 174/68.3
3,546,400 A * 12/1970 Dechantsreiter ........ B66C 13/12 174/69
3,770,022 A * 11/1973 Beisemann .......... H02G 11/006 138/108
3,770,875 A * 11/1973 Carlson ................ H02G 3/0437 174/68.2
4,487,218 A * 12/1984 Sifri ....................... B65H 75/38 242/379.2
4,738,009 A * 4/1988 Down .................. H01R 9/0509 408/241 B
4,775,121 A * 10/1988 Carty .................... F16L 3/2235 403/381
4,899,964 A * 2/1990 Sick .................... F16B 37/0842 248/68.1
4,990,722 A * 2/1991 Benito Navazo .... H02G 3/0418 174/101
5,095,822 A * 3/1992 Martin ..................... H02G 9/04 174/101
5,240,209 A 8/1993 Kutsch
5,271,382 A * 12/1993 Chikama ............. A61B 1/0055 138/120
5,274,603 A * 12/1993 Zibilich, Jr ........... G01V 1/201 174/101.5
5,642,612 A * 7/1997 Hughes ................... F16G 13/16 59/78.1
5,649,415 A * 7/1997 Pea ......................... F16G 13/16 248/51
5,777,266 A * 7/1998 Herman ................... H02G 9/04 138/155
5,780,773 A * 7/1998 Wakamatsu ......... H02G 3/0475 174/95
6,029,437 A * 2/2000 Hart ........................ F16G 13/16 248/51
6,367,238 B1 * 4/2002 Fischer ................... F16G 13/16 59/900
6,459,037 B2 * 10/2002 Muller ................. H02G 11/006 59/78.1
6,616,114 B2 * 9/2003 Zahn ........................ B65H 1/26 474/251
6,858,797 B2 * 2/2005 Sheikholeslami ... H02G 3/0475 174/68.3
7,055,678 B2 * 6/2006 Gundlach .............. B65G 17/08 198/852
7,175,138 B2 2/2007 Low et al.
7,309,836 B2 * 12/2007 Lubanski ............. H02G 3/0487 174/101
7,316,390 B2 * 1/2008 Burlison ................. B25B 5/147 269/274
8,561,949 B2 * 10/2013 Komiya .................. F16L 3/015 248/68.1
8,607,541 B1 * 12/2013 Cavuoti .................. F16G 13/18 446/236
8,662,456 B2 * 3/2014 Komiya ............... H02G 11/006 248/68.1
8,739,507 B2 * 6/2014 Hughes ................... F16G 13/18 59/900
9,279,221 B1 * 3/2016 Orona ................... E01D 15/124
9,464,689 B2 * 10/2016 Hermey ............... H02G 11/006
9,906,006 B2 * 2/2018 Handler ................. H02G 9/025
10,311,999 B2 * 6/2019 Sung ...................... H02G 11/00
10,570,993 B2 * 2/2020 Blase ..................... B65G 17/08
11,715,944 B1 * 8/2023 Baldwin .............. H02G 3/0437 174/207
11,923,636 B2 * 3/2024 Meyer ................ H01R 13/5812
2001/0017214 A1 * 8/2001 Saeki ................... H02G 3/0437 174/505
2004/0083709 A1 * 5/2004 Ikeda .................. H02G 11/006 59/78.1
2006/0070764 A1 * 4/2006 Utaki ................... H02G 3/0475 174/68.1
2006/0201696 A1 * 9/2006 Fox ......................... H02G 9/04 174/95
2007/0248412 A1 * 10/2007 Lubanski ............... H02G 9/025 404/83
2010/0133390 A1 * 6/2010 Lange .................. H02G 3/0418 248/65
2012/0037255 A1 * 2/2012 Hung ........................ F16L 3/26 138/108
2012/0267164 A1 * 10/2012 Reuss .................. H02G 3/0487 248/74.2
2012/0312933 A1 * 12/2012 Casadei .................. F16G 13/16 29/525.01
2014/0283943 A1 * 9/2014 Pecoraro ............. H02G 3/0475 138/177
2014/0311768 A1 * 10/2014 Takishita ................. H02G 5/04 174/66
2016/0285246 A1 * 9/2016 Fujita ................... H02G 3/0437
2016/0375591 A1 * 12/2016 Yoon ...................... B25J 18/025 74/490.05
2017/0275892 A1 * 9/2017 Boyd ................ E04F 15/02411
2018/0152010 A1 * 5/2018 Gaiser ...................... H02G 9/04
2018/0209576 A1 * 7/2018 Whitefield ............... H02G 9/12
2018/0361960 A1 * 12/2018 Yamamoto .......... B60R 16/0215
2020/0028337 A1 * 1/2020 Hartman .............. H02G 3/0456
2020/0112153 A1 * 4/2020 Kovalcin ............... H04B 17/10
2020/0144804 A1 * 5/2020 Wellens ..................... E01B 2/00
2020/0277739 A1 * 9/2020 Brooker ............... H02G 3/0418
2022/0094148 A1 * 3/2022 Hüppi-Ziegler ......... H02G 3/32
2023/0287960 A1 * 9/2023 Tavernier .................. F16G 3/08
2025/0118952 A1 * 4/2025 Ruayana ................... F16L 3/26

FOREIGN PATENT DOCUMENTS

CN 109416105 A * 3/2019 ............. H02G 11/00
DE 10017514 A1 * 10/2001 ........... B29C 69/001
DE 102007030981 A1 * 1/2009 ........... H02G 3/0475
DE 102013226954 A1 * 6/2015 ............. F16G 13/16
DE 202015005140 U1 * 7/2015 ........... H02G 11/006
DE 202020100606 U1 * 3/2021 ........... H02G 11/006
DE 202023103143 U1 * 6/2023 ............. F16G 13/16
EP 3772787 A1 * 2/2021 ........... H02G 11/006
GB 951478 A * 3/1964 ............. B66C 13/12
GB 1073438 A * 6/1967 .............. E21F 17/06
GB 1087593 A 10/1967
GB 2175754 A * 12/1986 ........... H02G 3/0475
GB 2238594 A 6/1991
GB 2367954 A * 4/2002 ........... H02G 3/0437
JP H1182816 A * 3/1999 ................ F16L 3/16
KR 100882321 B1 * 2/2009 ........... H02G 3/0487
KR 20120060527 A * 6/2012 ........... H02G 11/006
KR 20190089526 A * 7/2019 ............. F16G 13/16
TW 1388742 B * 3/2013 ........... H02G 3/0475
WO WO-03044919 A1 * 5/2003 ............. H02G 9/025
WO WO-2016133046 A1 * 8/2016 ........... H02G 3/0475
WO WO-2019150928 A1 * 8/2019 ............. F16G 13/16
WO WO-2024188632 A1 * 9/2024 ............... H02G 3/32

* cited by examiner

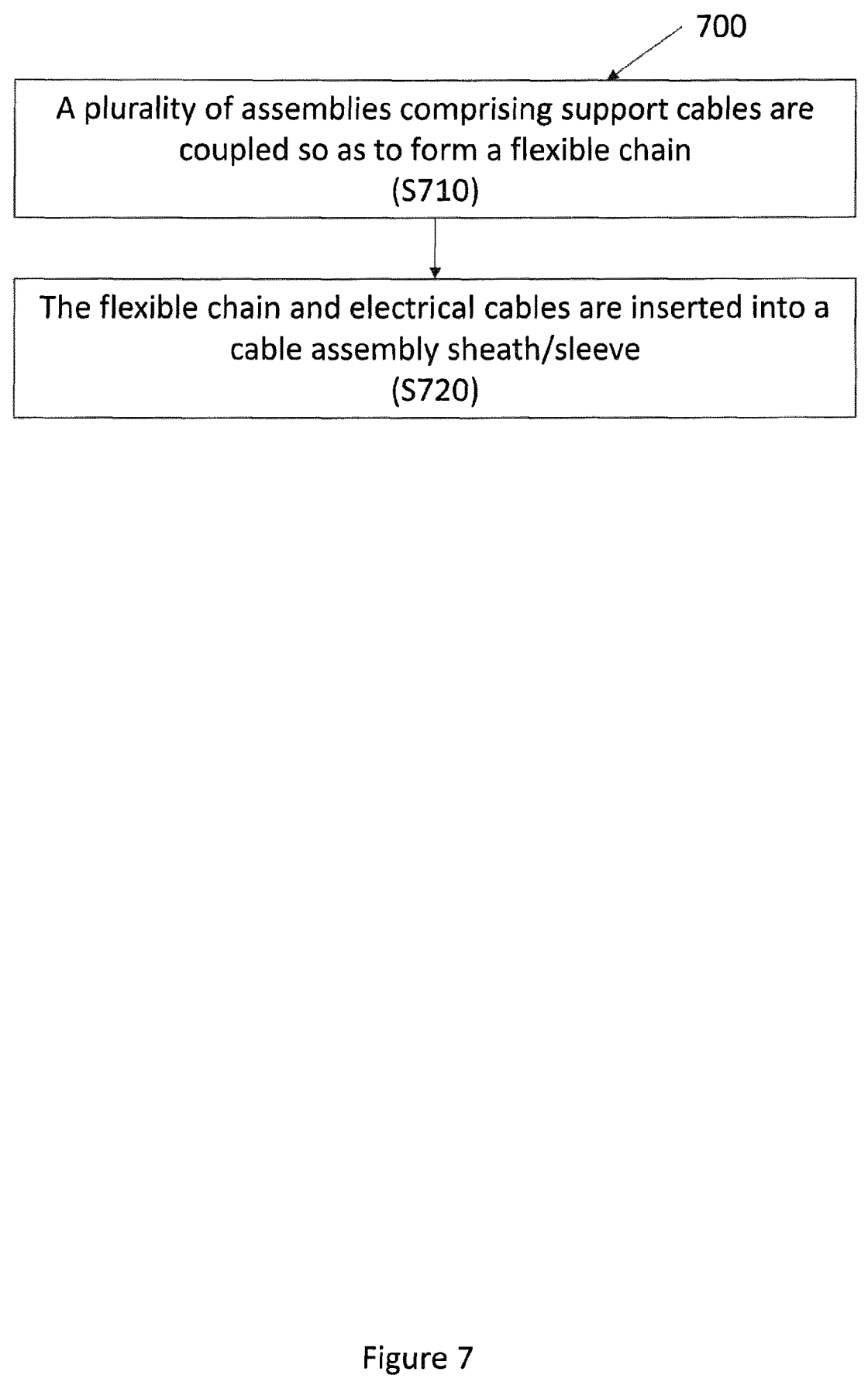

700

A plurality of assemblies comprising support cables are coupled so as to form a flexible chain
(S710)

The flexible chain and electrical cables are inserted into a cable assembly sheath/sleeve
(S720)

Figure 7

ASSEMBLY AND METHOD FOR SUPPORTING A CABLE

RELATED APPLICATIONS

This application corresponds to PCT/CA2021/051362, filed Sep. 29, 2021, the subject matter of which is incorporated herein by reference in its entirety.

FIELD OF THE INVENTION

The present invention relates to an assembly for supporting a cable and an associated method. The assembly comprises a first piece and a second piece each comprising a hole through which a screw is inserted. This allows for a simple assembly which is easily repairable.

BACKGROUND TO THE INVENTION

The prior art relating to the present invention involves supporting a cable by using a metal strip as the basis for the support and then overmolding the metal strip to form a plurality of indexing tabs which define a plurality of plastic placement pieces for the cable. This results in a support assembly which is labor intensive during assembly. Furthermore, this method reduces the ability for the support to be extended along a longitudinal axis of the cable if desired and a reduction in the ability to change the bending radius of the cable support. Additionally, in order to replace a section of the support assembly, the entire assembly must be broken in order to retrieve the cable.

There is therefore a need for a support assembly which has a simple construction, which is repairable and which allows for a high level of customization.

SUMMARY OF THE INVENTION

The invention is set out in the independent claims. Preferred embodiments of the invention are outlined in the dependent claims.

According to a first aspect, an assembly for supporting a cable is described. The assembly comprises a first piece comprising a first hole and a second piece comprising a second hole. Furthermore, the first hole and the second hole are configured to be aligned with one another. Additionally, the first hole and the second hole are configured to accept a screw and/or nut for securely coupling the first piece and the second piece to one another. Moreover, the second piece further comprises a protrusion configured to interact with at least a section of the first piece, wherein the protrusion and the section of the first piece are configured to temporarily couple the first piece and the second piece to one another before the screw and/or the nut is inserted into the first hole and the second hole.

The above assembly may result in an assembly with a simple construction while maintaining a high level of support and security. The above assembly may also be easily repairable as only the first or second piece can be removed and replaced. This may lead to lower maintenance costs, a reduction in waste and the ability to maintain the undamaged part of the assembly without having to remove said undamaged part.

The assembly may be inserted into a cable assembly sheath or cable assembly sleeve of a larger cable assembly. For example, the cable described above may be a support wire for the assembly and the above-described assembly may be inserted into a central portion of the cable assembly sheath of the larger cable assembly.

Alternatively, the above-described assembly may be inserted into a portion of the cable assembly sheath which is not central to the cable assembly sheath. The support wire may not be capable of transmitting electrical signals and/or data. One or more electrical cables may then be inserted into the cable assembly sheath of the cable assembly either side of the above-described assembly in order to create a cable assembly suitable for transmitting electrical signals and/or data while still maintaining a degree of rigidity in the cable assembly. Alternatively, the support wire described above may be an electrical cable capable of transmitting electrical signals and/or data. The support wire described above may additionally or alternatively be a guide wire configured to guide the assembly. The cable described above may be a support/guide cable configured to support and/or guide the assembly. The support/guide wire and/or the support/guide cable may not be capable of transmitting electrical signals and/or data.

A sheath is described within the present application. However, the sheath may alternatively be a sleeve, a jacket, a cover or any other item suitable for the above-described assembly to be inserted into.

The first and second pieces may be of any suitable shape which allows for the assembly to be assembled. For example, the first and second pieces may be substantially circular, substantially square, substantially rectangular or substantially triangular. In some examples, both the first and second pieces are substantially the same shape but in some examples, they may be different shapes.

The first and second holes may be of any diameter which can accept the screw such as, for example, a screw described in ISO 261 and/or ISO 262. The holes may comprise threads which accept the screw inserted into the first and second holes. In some examples, the first and second pieces comprise only a single hole each for a single screw to couple the pieces to one another. In some examples, there are a plurality of holes in each of the first and second pieces in order to allow a plurality of screws to couple the first and second pieces together. In some examples, the screw is configured to be coupled to a nut in order to secure the first and second pieces in place.

The protrusion on the second piece may be of a substantially cuboidal design, a substantially cylindrical design or a bespoke design. The section of the first piece with which the protrusion interacts with may have a corresponding design configured to accept the protrusion. The protrusion may allow for the first and second pieces to be held together while the assembly is tensioned and securely coupled with the screw and/or the nut, thereby leading to a safe method of assembly construction. In some examples, there are a plurality of protrusions on the second piece. In some examples, both the first and second pieces comprise protrusions. In some examples, only the first piece comprises protrusions.

The first and second pieces are preferably formed from plastic via a molding process but may be made of any suitable material such as, for example, carbon fiber or metal. The use of plastic may reduce production and maintenance costs. In some examples, one of the pieces is made from a first material and the other piece is made from a second material. In some examples, each of the pieces may comprise multiple materials.

In some examples, the assembly is one of a plurality of assemblies configured to be coupled to one another. This may allow for the cable to be supported along a substantial length of said cable. Each of the rest of the plurality of assemblies may be constructed in substantially the same manner as the assembly described above. Thus may allow for easy repair of the assembly should one section be damaged. It may also allow for a reduction in maintenance costs as specialist pieces are not required to be manufactured. The plurality of assemblies may also form a flexible chain, wherein the flexible chain flexes in a substantially longitudinal axis of the chain. Additionally or alternatively, the flexible chain may flex in a substantially longitudinal axis of the chain and/or a substantially rotational axis of the chain.

In some examples, the second piece further comprises a channel configured to hold a wire, wherein the wire cable is configured to be placed into the channel and be clamped between the first piece and the second piece while the first piece and the second piece are temporarily coupled to one another. Alternatively, the wire may be an electrical cable. Alternatively, there may be multiple wires and/or electrical cables held within the channel. The wire or the cable may be configured as a flexible and/or bendable wire or cable. The wire or the cable placed and clamped within the channel is preferably configured as a support/guide wire or support/guide cable e.g. as described above. This may allow for the wire or the cable to be kept in place while in use. The channel may be of a suitable diameter to hold the wire or the cable securely. The support/guide wire or the support/guide cable may not be capable of transmitting electrical signals and/or data.

In some examples, the first piece further comprises a first plurality of elongated members, wherein the first plurality of elongated members are situated on a plane perpendicular to the longitudinal axis of the first hole. These elongated members are preferably substantially cuboidal but may be substantially cylindrical, substantially prismatic or of a bespoke design. The elongated members may be made of a different material from the main body of the first piece as the elongated members may undergo more strain and stress.

In some examples, at least a first one of the first plurality of elongated members is configured to extend from a first side of the first piece and at least a second one of the first plurality of elongated members is configured to extend from a second side of the first piece, wherein the first side and the second side are opposite sides of the first piece. This may allow for the first piece to interact with a substantially similar first piece from a second assembly. This in turn may allow for the assemblies to be coupled to each other thereby creating a row of assemblies. The design of the first plurality of elongated members may be simple in order to reduce production and maintenance costs.

In some examples, a first number of the first plurality of elongated members extending from the first side of the first piece is one more than a second number of the first plurality of elongated members extending from the second side of the first piece. As a non-limiting example, there may be three elongated members on the first side of the first piece and two elongated members on the second side of the first piece. As other assemblies may be constructed in a substantially similar manner as the above-described assembly, other assemblies may have a similar design. That is to say, the two elongated members on the second side of the first piece may interlock with three elongated members on a first piece of a second assembly. The elongated members may be coupled via a hook and bar, a latch, a bolt, or any other suitable method. This may allow for a simple method of coupling and a reduction in manufacturing and maintenance costs.

In some examples, the first plurality of elongated members on the first piece are configured to interact with a second plurality of elongated members on a third piece, wherein the first piece and the third piece are substantially similar and wherein the third piece is part of a second assembly. That is to say, the two elongated members on the second side of the first piece may interlock with three elongated members on a first piece of a second assembly. The elongated members may be coupled via a hook and bar, a latch, a bolt, or any other suitable method. This may allow for a simple method of coupling and a reduction in manufacturing and maintenance costs.

In some examples, the plurality of assemblies are configured to be coupled in a substantially linear direction via the first plurality of elongated members. This may be in alignment with a longitudinal axis of the cable to be supported. This may therefore allow for the cable to flex in the longitudinal axis of said cable while also allowing for the cable to be supported.

In some examples, the plurality of assemblies are configured to flex in a longitudinal axis of the plurality of assemblies via the first plurality of elongated members. This may allow for the cable to flex in the longitudinal axis of said cable while also allowing for the cable to be supported. The flexing is not restricted to the longitudinal direction and the plurality of assemblies may also flex in the latitudinal direction and/or a rotational direction.

According to a second aspect, a method for supporting a cable is described. The method comprises a first piece comprising a first hole, and a second piece comprising a second hole and aligning the first hole and the second hole with one another. The method further comprises temporarily coupling the first piece and the second piece via a protrusion on the second piece, wherein the protrusion and at least a section of the first piece are configured to interact with one another. The method further comprises securely coupling the first piece and the second piece to one another by inserting a screw and/or a nut into the first hole and the second hole to form an assembly.

The above method may result in an method of an assembly with a simple construction while maintaining a high level of support and security. The above method of supporting the cable may also result in an assembly which is easily repairable as only the first or second piece can be removed and replaced. This may lead to lower maintenance costs, a reduction in waste and the ability to maintain the undamaged part of the assembly without having to remove said undamaged part.

The first and second pieces may be of any suitable shape which allows for the assembly to be assembled in the method. For example, the first and second pieces may be substantially circular, substantially square, substantially rectangular or substantially triangular. In some examples, both the first and second pieces are substantially the same shape but in some examples, the may be substantially different shapes.

The first and second holes may be of any diameter which can accept the screw such as, for example, a screw described in ISO 261 and/or ISO 262. The holes may comprises threads which accept the screw inserted into the first and second holes. In some examples, the first and second pieces comprise only a single hole each for a single screw to couple the pieces to one another. In some examples, there are a plurality of holes in each of the first and second pieces in order to allow a plurality of screws to couple the first and second pieces together. In some examples, the screw is configured to be coupled to a nut in order to secure the first and second pieces in place.

The protrusion on the second piece may be of a substantially cuboidal design, a substantially cylindrical design or a bespoke design. The section of the first piece with which the protrusion interacts with may have a corresponding design configured to accept the protrusion. The protrusion may allow for the first and second pieces to be held together while the assembly is tensioned and securely coupled with the screw and/or the nut, thereby leading to a safe method of assembly construction. In some examples, there are a plurality of protrusions on the second piece. In some examples, both the first and second pieces comprise protrusions. In some examples, only the first piece comprises protrusions.

In some examples, the assembly is one of a plurality of assemblies configured to be coupled to one another. This may allow for a cable to be supported along a substantial length of said cable. Each of the rest of the plurality of assemblies may be constructed in substantially the same manner as the assembly described above. Thus may allow for easy repair of the assembly should one section be damaged. It may also allow for a reduction in maintenance costs as specialist pieces are not required to be manufactured.

In some examples, the second piece further comprises a channel configured to hold a wire, and wherein the method further comprises placing the wire in a channel of the second piece and clamping the wire between the first piece and the second piece during the temporary coupling of the first piece and the second piece. Alternatively, the wire may be an electrical cable. Alternatively, there may be multiple wires and/or electrical cables held within the channel. The wire or the cable may be configured as a flexible and/or bendable wire or cable. The wire or the cable placed and clamped within the channel is preferably configured as a support/guide wire or a support/guide cable e.g. as described above. This may allow for the wire or the cable to be kept in place while in use. The channel may be of a suitable diameter to hold the wire or the cable securely. The support/guide wire or the support/guide cable may not be capable of transmitting electrical signals and/or data.

In some examples, the first piece further comprises a first plurality of elongated members, wherein the first plurality of elongated members are situated on a plane perpendicular to the longitudinal axis of the first hole. These elongated members are preferably substantially cuboidal but may be substantially cylindrical, substantially prismatic or of a bespoke design. The elongated members may be made of a different material from the main body of the first piece as the elongated members may undergo more strain and stress.

In some examples, at least a first one of the first plurality of elongated members is configured to extend from a first side of the first piece and at least a second one of the first plurality of elongated members is configured to extend from a second side of the first piece, wherein the first side and the second side are opposite sides of the first piece. This may allow for the first piece to interact with a first piece from a second assembly. This in turn may allow for the assemblies to be coupled to each other thereby creating a row of assemblies. The design of the first plurality of elongated members may be simple in order to reduce production and maintenance costs.

In some examples, the method further comprises coupling the plurality of assemblies in a substantially linear direction via the first plurality of elongated members. This may be in alignment with a longitudinal axis of the cable. This may therefore allow for the cable to flex in the longitudinal axis of said cable while also allowing for the cable to be supported.

In some examples, not all of these steps are required. In some examples, the steps may be in a different order. In some examples, some of the steps happen simultaneously.

In addition to the advantages described in relation to the above aspects, the presently claimed invention may also allow for a support with a long length while reducing the effects of sagging and bowing the support. It may also allow for the simple replacement of pieces without having to replace the entire assembly.

Even if some of the aspects described above have been described in reference to the assembly, these aspects may also apply to the method and vice versa.

BRIEF DESCRIPTION OF THE DRAWINGS

These and other aspects of the invention will now be further described, by way of example only, with reference to the accompanying figures, wherein like reference numerals refer to like parts, and in which:

FIG. 7 shows a flow diagram of a method for constructing a cable assembly according to an embodiment described herein.

DETAILED DESCRIPTION OF THE PREFERRED EMBODIMENTS

Figure 1:
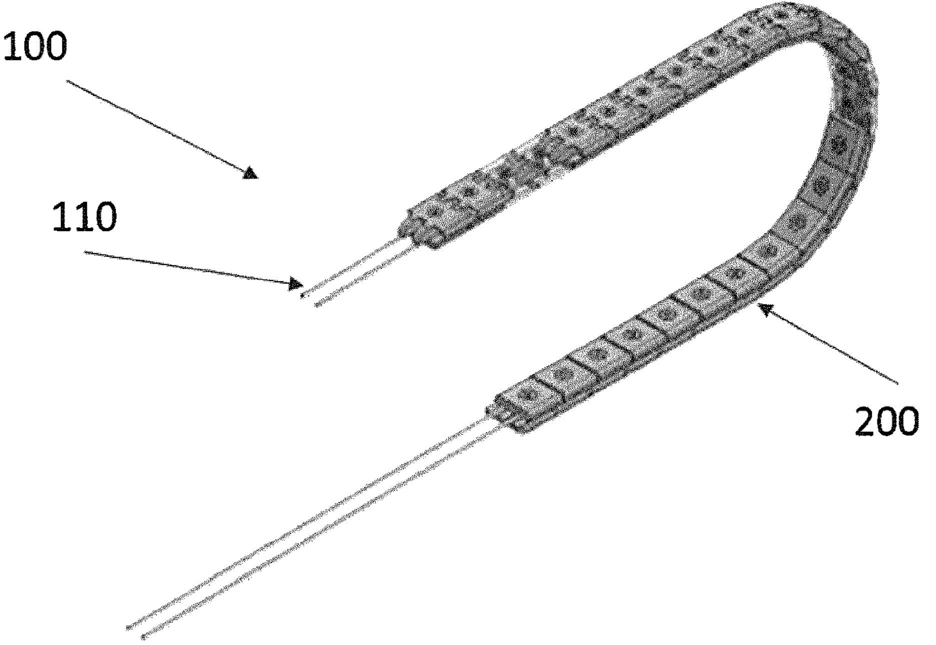
FIG. 1 shows a perspective view of a plurality of assemblies supporting a cable according to an embodiment described herein.

FIG. 1 shows a perspective view of a plurality of assemblies supporting a cable according to an embodiment described herein.

FIG. 1 shows a cable support 100 comprising two wires or cables 110 and a plurality of assemblies 200. The assemblies 200 are designed so that when they are coupled to each other, the assemblies 200 and therefore the wires or cables 110 can flex in a substantially longitudinal direction of the wires or cables 110. In this embodiment, there are two wires or cables 110. However, there may be any number of wires or cables 110 supported by the assemblies 200 and the cable support 100.

The wires or cables 110 are preferably support/guide wires or support/guide cables i.e. wires or cables may not capable of transmitting electrical signals and/or data. The wires or cables 110 may comprise plastic and/or metal and/or an electrical insulator and/or any other suitable material which is lightweight and flexible. The cable support 100 forms a flexible chain due to the plurality of assemblies. The chain may flex in a substantially longitudinal axis of the chain and/or a substantially longitudinal axis of the chain and/or a substantially rotational axis of the chain.

The cable support 100 can be part of a cable assembly, as will be described in more detail below.

Figure 2:
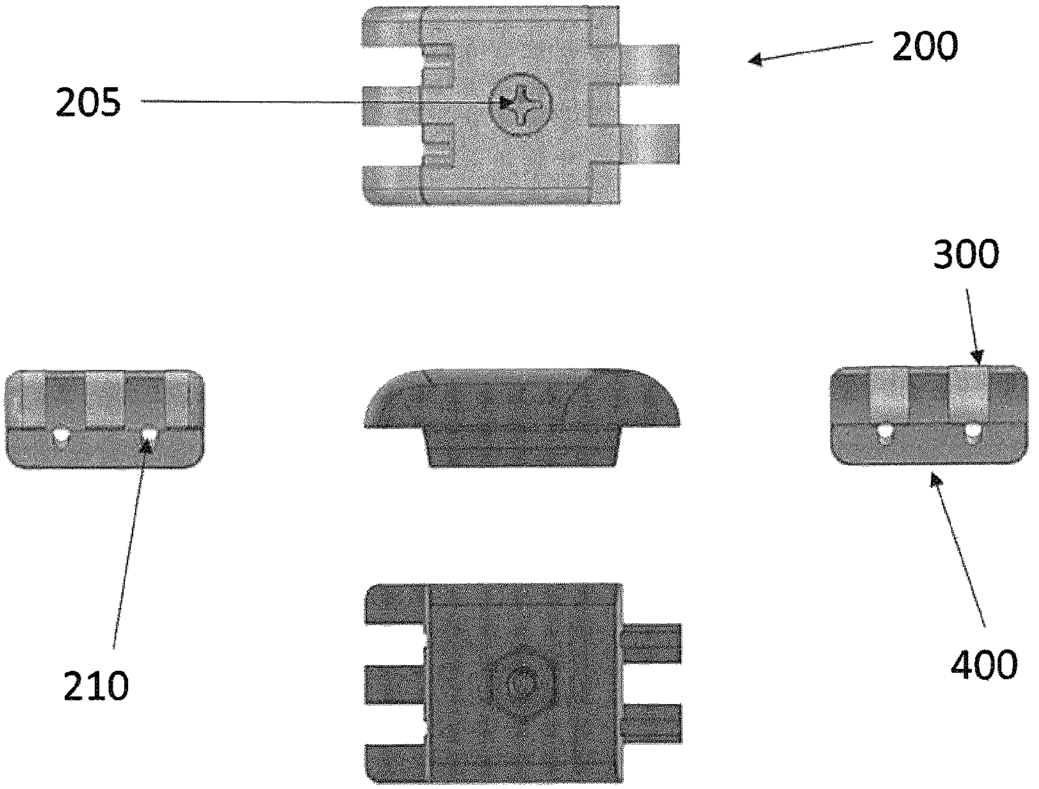
FIG. 2 shows multiple views of an assembly according to an embodiment as described herein.

FIG. 2 shows multiple views of an assembly according to an embodiment as described herein.

FIG. 2 shows a completed assembly 200. The assembly comprises a screw 205, a plurality of openings 210, a first piece 300, and a second piece 400. The first piece 300, and the second piece 400 will be described in further detail below. The screw 205 is of any suitable diameter and has any suitable thread pitch. Preferably, the screw 205 is in accordance with ISO 261 and/or ISO 262 but may be in accordance with any other international standard. In this embodiment, only a single screw 205 is shown but there may alternatively be a plurality of screws 205. In some embodiments, the screw 205 is configured to be coupled to a nut in order to secure the first and second pieces 300, 400 in place. Additionally or alternatively, the assembly 200 is coupled by nuts and bolts through tabs affixed to the sides of the first piece 300 and the second piece 400 and/or a latch and/or any other method which allows for the first 300 and second 400 pieces to be securely coupled to each other and easily separated from each other. The screw 205 may preferably be a countersunk screw.

The assembly 200 comprises two openings 210 which allow the wires or cables 110 to pass through the assembly 200. The openings 210 may be of the same diameter as the wires or cables 110 or of a slightly smaller diameter. If the openings 210 are of the same diameter as the wires or cables 110, this may allow for the assembly to slide along the wires or cables 110. This may be beneficial if certain areas of the wires or cables 110 need to be supported at different times. In order to stop the assembly 200 from sliding too far along the wires or cables 110, one or more of the wires or cables 110 may comprise an element configured to arrest the movement of the assembly 200. If the openings 200 are of a smaller diameter than the wires or cables 110, the wires or cables 110 may be clamped in place by the assembly 200 and the assembly 200 may not slide along the wires or cables 110. This may be beneficial in applications where a particular area of the cables 110 must be supported at all times. The openings 210 are preferably circular but they may alternatively be square, rectangular, triangular or a bespoke shape.

Figure 3:
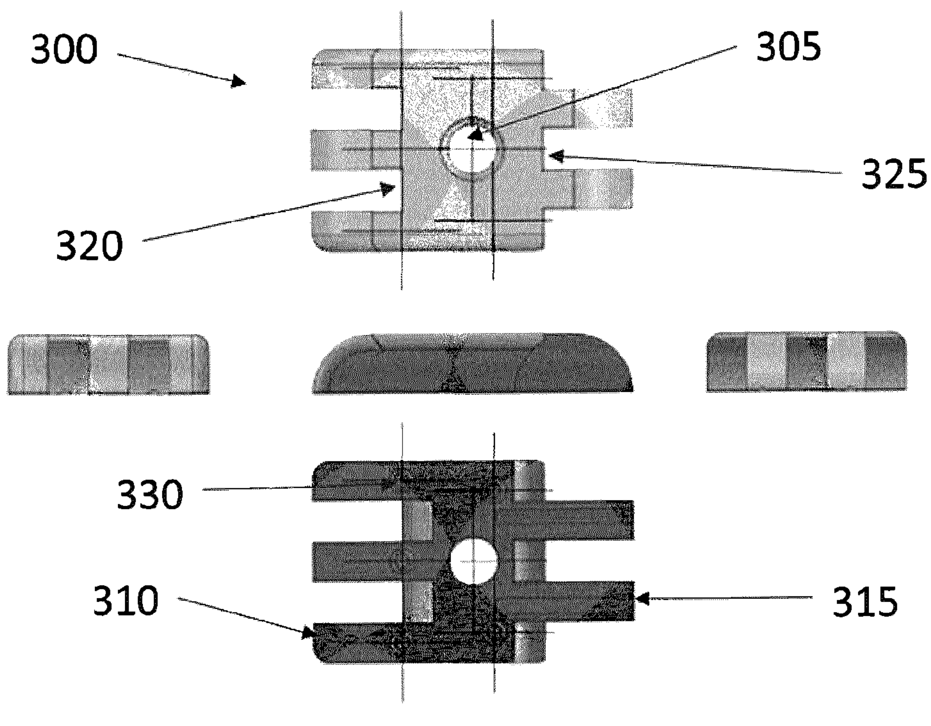
FIG. 3 shows multiple views of a first piece of the assembly according to an embodiment as described herein.

FIG. 3 shows multiple views of a first piece of the assembly according to an embodiment as described herein.

FIG. 3 shows a top view, multiple side views and a bottom view of the first piece 300. The first piece comprises a first screw hole 305, a plurality of elongated elements 310, 315 and a plurality of recesses 330.

The first hole 305 preferably has a thread pitch that is substantially the same as the pitch of the screw 205 in order to securely hold the screw 205 within the first hole. The first hole 305 is also of a diameter suitable to receive the screw 205.

The first piece 300 further comprises a plurality of elongated elements 310, 315.

The first set of elongated elements 310 comprise of three elongated elements 310. These elongated elements 310 extend in a plane perpendicular to the longitudinal axis of the first hole 305 on a first side of the first piece 300 and all extend substantially parallel to one another. The elongated elements 310 comprise an open loop at the end of the elongated element 310 furthest from the main body of the first piece 300. At the end of the elongated elements 310 closest to the main body of the first piece 300, there is a coupling element 320 located between the elongated elements 310.

The second set of elongated elements 315 comprise of two elongated elements 315. These elongated elements 315 extend in a plane perpendicular to the longitudinal axis of the first hole 305 on a second side of the first piece 300 and extend substantially parallel to one another. The first side and the second side of the first piece 300 are opposite to each other. Additionally, the first and second set of elongated elements 310, 315 extend along the longitudinal axis of the first piece 300. The elongated elements 315 comprise an open loop at the end of the elongated element 315 furthest from the main body of the first piece 300. At the end of the elongated elements 315 closest to the main body of the first piece 300, there is a coupling element 325 located between the elongated elements 315.

When coupling the assembly 200 to a second assembly, the open loops of the first set of elongated elements 310 of the first assembly 200 are coupled to the coupling element 325 between the second set of elongated elements 315 the second assembly. The skilled person understands that this allows for a flexible chain to be formed. If the first assembly were to be coupled to a third assembly, the open loops of the second set of elongated elements 315 of the first assembly 200 are coupled to the coupling elements 320 between the first set of elongated elements 315 of the third assembly. This process is repeated until the desired length of the cable support is achieved. This results in a cable support which is particularly flexible in a longitudinal direction along the length of the cable support.

In some embodiments, only the first set of elongated elements 310 comprise open loops and there is only a coupling element 325 between the second set of elongated elements 315. In some embodiments, only the second set of elongated elements 315 comprise open loops and there is only coupling elements 320 between the first set of elongated elements 310. In some embodiments, there is only a first set of elongated elements 310 or a second set of elongated elements 315.

In this embodiment, there are three elongated elements in the first set of elongated elements 310 and two elongated elements in the second set of elongated elements 315. In some embodiments, the number of elongated elements in each set of elongated elements 310, 315 may be different according to the application the wires or cables 110 are being used in.

The plurality of recesses 330 are configured to interact with a plurality of protrusions located on the second piece 400. In this embodiment, the recesses 330 are of a cylindrical shape however, they may be of any shape which is suitable to accept the plurality of protrusions such as, for example, cuboidal, prismatic or a bespoke shape. The interaction between the plurality of recesses 330 and the plurality of protrusions will be described in more detail below.

Figure 4:
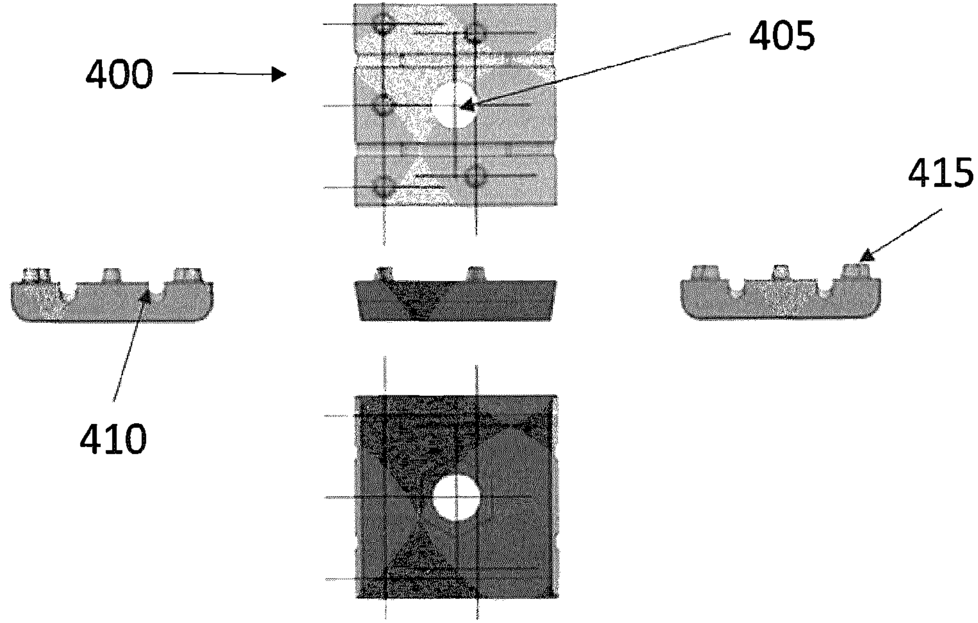
FIG. 4 shows multiple views of a second piece of the assembly according to an embodiment as described herein.

FIG. 4 shows multiple views of a second piece of the assembly according to an embodiment as described herein.

The second piece 400 comprises a second hole 405, a plurality of channels 410 and a plurality of protrusions 415.

The second hole 405 preferably has a thread pitch that is substantially the same as the pitch of the screw 205 in order to securely hold the screw 205 within the second hole 405. The second hole 405 is also of a diameter suitable to receive the screw 205. When coupling the first piece 300 and the second piece 400, the first 305 and second 405 holes are aligned so as to allow for the screw 205 to pass through both pieces 300, 400 is a substantially straight manner and to allow for the pieces 300, 400 to be securely coupled to each other. In some embodiments, the screw 205 is configured to be coupled to a nut in order to secure the first and second pieces 300, 400 in place.

The second piece 400 further comprises a plurality of channels 410. In this embodiment, there are two channels 410 as there are two wires or cables 110 however, the number of channels 410 can change depending on the number of wires or cables 110. The wires or cables 110 placed within the channels 410 are preferably support/guide wires or support/guide cables e.g. as described above. The channels 410 are of a sufficient diameter and cross-section to hold the cables 110. The channels 410 are, in this embodiment, cylindrical but they may be prismatic, cuboidal or of a bespoke shape. The channels 410 run substantially parallel to the longitudinal axis of the second piece 400 and run along the entire length of the second piece 400. In some embodiments, the channels 410 do not run substantially parallel to the longitudinal axis of the second piece 400 and/or do not run along the entire length of the second piece 400.

The second hole 405 is placed between the two channels 410 in the second piece 400. This allows for a secure coupling of the assembly 200 while preventing damage to the wires or cables 110 that may be caused due to the insertion of the screw 205.

The plurality of protrusions 415 are configured to interact with the plurality of recesses 330 on the second piece 300. In this embodiment, the protrusions 415 are of a cylindrical shape however, they may be of any shape which is suitable to accept the plurality of protrusions such as, for example, cuboidal, prismatic or a bespoke shape. As can been seen in FIGS. 3 and 4, the plurality of recesses 330 and the plurality of protrusions 415 are located on the same positions in their respective pieces 300, 400 so as to form a secure temporary coupling. The method of temporary coupling is described in more detail below. In some embodiments, the number of protrusions 415 and recesses 330 are equal. Alternatively, the number of protrusions 415 and recesses 330 may be unequal. In some embodiments, there is only one recess 330 and one protrusion 415. In some embodiments, there are no recesses 330 or protrusions 415.

The second piece 400 may be exchanged within an assembly 200 in order to alter the bending radius of the wire or cable 110. This may allow for the cable support 100 to be altered based on the application of the wires or cable 110. Additionally or alternatively, the first part 300 may be exchanged in order to alter the bending radius of the wire or cable 110.

Figure 5:
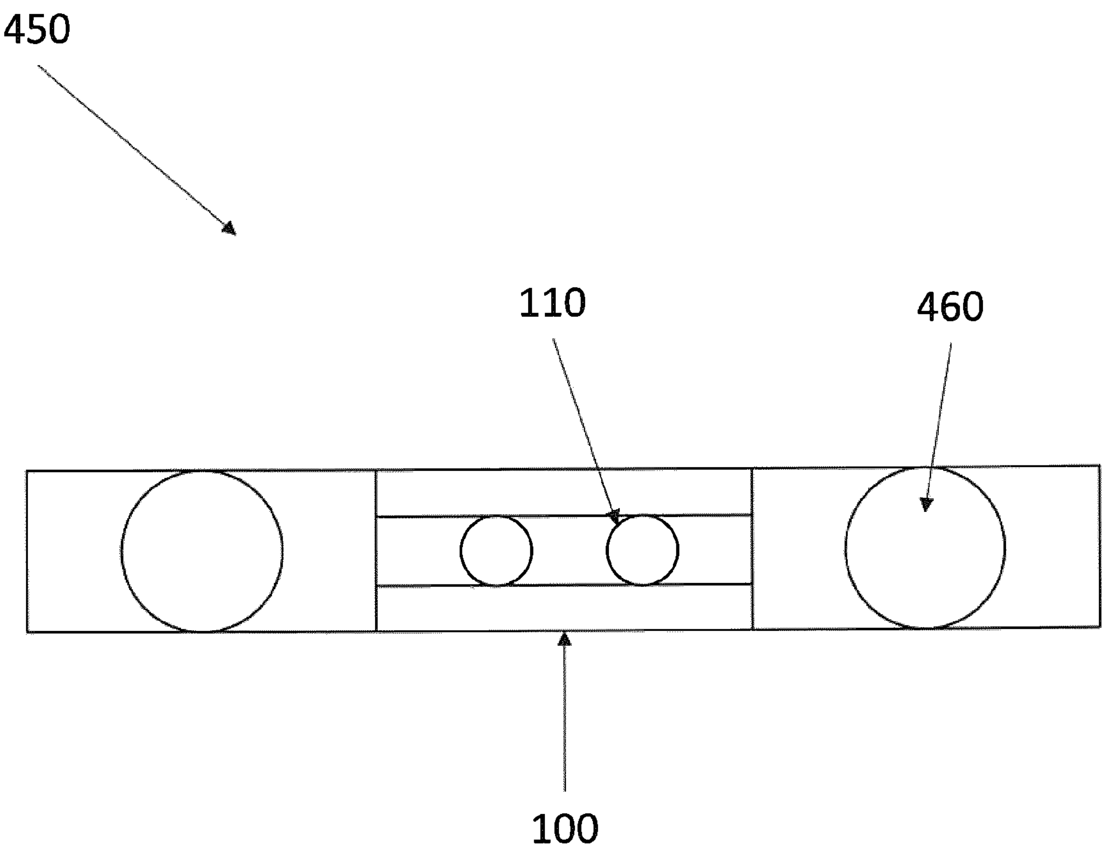
FIG. 5 shows a perspective view of a cable assembly according to an embodiment described herein.

FIG. 5 shows a perspective view of a cable assembly according to an embodiment described herein.

In FIG. 5, the cable support 100 is arranged within a cable assembly 450. In this embodiment, two wires or cables 110 are situated within the assembly 200.

Alternatively, there may be any suitable number of wires or cables 110 within the assembly 200. In this embodiment, the wires or cables 110 are support/guide wires or support/guide cables which may not capable of transmitting electrical signals and/or data, as described above. Situated beside the assembly 200 is at least one electrical cable 460 capable of transmitting electrical signals and/or data. In some embodiments, the electrical cable 460 is replaced by a cable not capable of transmitting electrical signals and/or data. There may be any number of electrical cables 460 within the cable assembly 450 which may be located in any suitable location within the cable assembly 450. Alternatively, there may be any number of non-electrical cables within the cable assembly 450 which may be located in any suitable location within the cable assembly 450. In some embodiments, there are both electrical 460 and non-electrical cables within the cable assembly 450 which may be located in any suitable location within the cable assembly 450. In some embodiments, the cable assembly 450 is then inserted into a cable assembly sheath.

The cable assembly sheath of the cable assembly 450 may comprise plastic and/or metal and/or an electrical insulator and/or any other suitable material which is flexible. Additionally or alternatively, the at least one electrical cable 460 or the electrical cables 460 are situated in their own respective individual electrical cable sheathes. In some embodiments, one or more of the wires or cables 110 within the assembly 200 are electrical cables capable of transmitting electrical signals and/or data. The arrangement shown in FIG. 5 allows for the cable assembly 450 to have a degree of rigidity and support while still allowing for the cable assembly 450 to flex. In some embodiments, the assembly 200 is not in the center of the cable assembly 450.

The electrical cables 460 may be electrical cables capable of transmitting electrical signals and/or data. In some embodiments, the electrical cables 460 and/or the cable assembly 450 may be High Performance Flex (HPF) cables which may allow for small bending radii (of the cable) while still maintaining data transfer. HPF cables may be optimized based on the application of the cable and may be particularly suitable in applications which require high accelerations and application speeds. In some embodiments, the electrical cable 460 is replaced by a cable not capable of transmitting electrical signals and/or data. In some examples, there are both electrical 460 and non-electrical cables.

Figure 6:
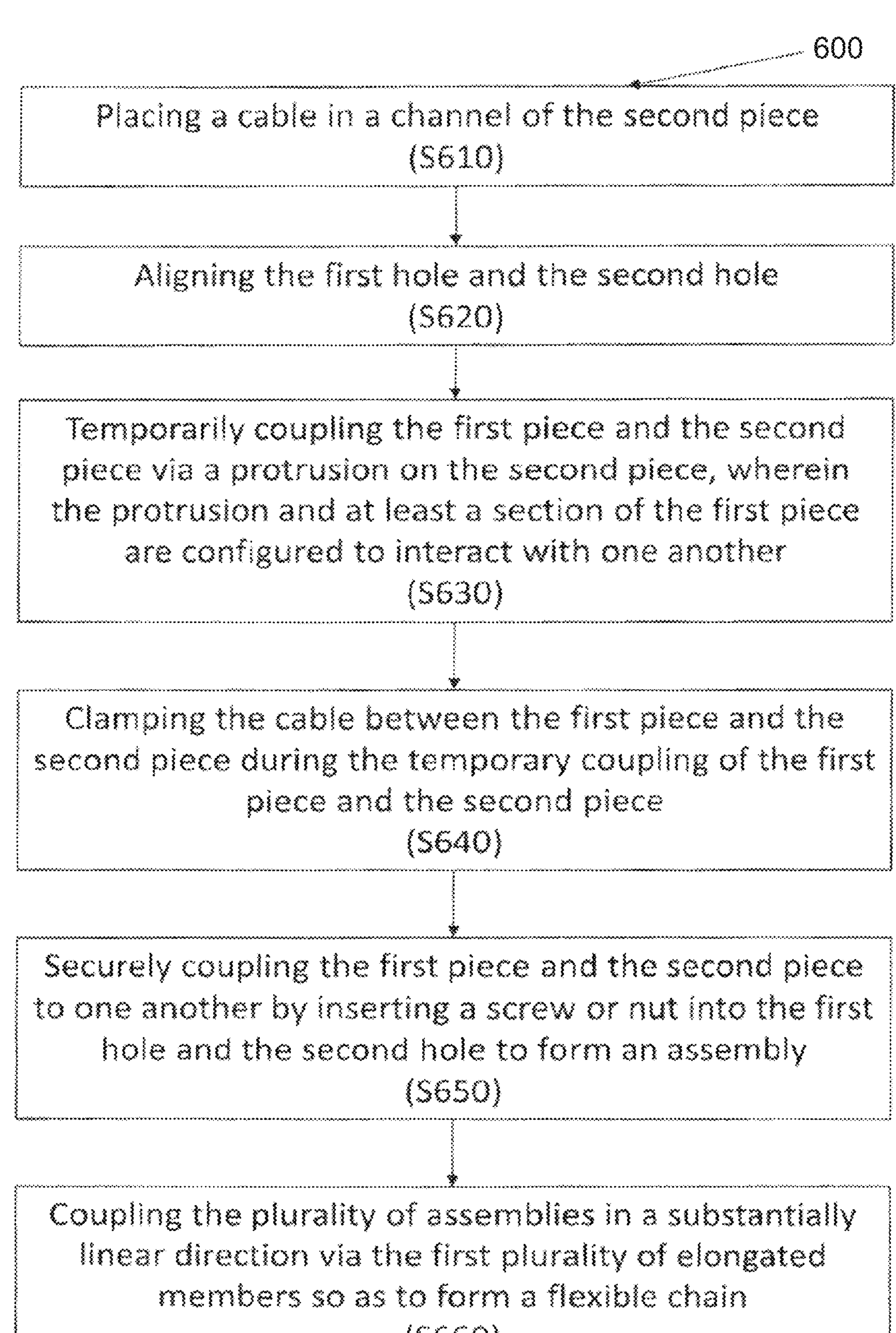
FIG. 6 shows a flow diagram of a method for supporting a cable according to an embodiment described herein.

FIG. 6 shows a flow diagram of a method for supporting a cable according to an embodiment described herein.

The method 600 for supporting a cable first comprises the step of aligning S610 the first hole 305 of the first piece 300 and the second hole 405 of the second piece 400.

After a wire or cable 110 is placed S610 into a channel 410 of the second piece 400, the first hole 305 and the second hole 405 are aligned S620 with each other. As described above, the channel 410 allows for the support wire or cable 110 to be kept in place while the cable support 100 is in use. The channel also allows for the wire or cable 110 to be protected from undue stresses within the assembly 200. The wire or cable 110 is preferably the support cable as described above.

The first piece 300 and the second piece 400 are then temporarily coupled S630 via the plurality of protrusions 415 on the second piece 400 and the plurality of recesses 330 on the first piece 300. In order to temporarily couple S630 the first 300 and second 400 pieces, the two pieces 300, 400 are pressed together. The protrusions 415 and recesses 330 then interact with each other in order to form the temporary coupling.

As the first 300 and second 400 pieces are temporarily coupled S630, the support wire or cable 110 is clamped S540 between the first 300 and second 400 pieces. This secures the support wire or cable 110 in places and prevents the wire or cable 110 from moving through the assembly 200 during the following steps.

The first 300 and second 400 pieces are then securely coupled S650 by inserting the screw 205 and/or a nut into the first 305 and second 405 holes. This secures the assembly 200 and prevents the pieces 300, 400 from uncoupling and also secures the support wire or cable 110 in place.

After the first 300 and second 400 pieces have been securely coupled S550, the assembly 200 is then coupled S560 to one or more other assemblies 200 via the elongated elements 310, 315 and the coupling elements 320, 325 on the first piece 300 in order to form the cable support 100. This coupling of the plurality of assemblies 200 may lead to the formation of a flexible chain. The chain may flex in a substantially longitudinal axis of the chain and/or a substantially longitudinal axis of the chain and/or a substantially rotational axis of the chain.

In some embodiments, not all of these steps are required. In some examples, the steps may be in a different order. In some examples, some of the steps happen simultaneously. For example, in some embodiments, the wire or cable 110 is placed S620 in the channel 410 before the first 305 and second 405 hole are aligned S510.

In some embodiments, the assembly 200 is coupled S560 to one or more other assemblies 200 before the first 300 and second 400 pieces are securely coupled S650.

FIG. 7 shows a flow diagram of a method 700 for constructing a cable assembly according to an embodiment described herein.

In this embodiment, the assemblies 200 are constructed as described above in relation to FIGS. 1 to 4 and 6, and the wires or cables 110 within the assemblies are support cables as described above.

The plurality of assemblies 200 are then coupled S710 to each other, via the elongated elements 310, 315 and coupling elements 320, 325 of the assemblies 200, so as to form a flexible chain. The flexible chain may flex in a substantially longitudinal axis of the chain and/or a substantially longitudinal axis of the chain and/or a substantially rotational axis of the chain. As this chain comprises only support cables, the wires or cables 110 within the chain may not transmit any electrical signals and/or data.

After the flexible chain has been formed, the flexible chain and the electrical cables 460 are then inserted S720 into a cable assembly sheath of a cable assembly 450.

The electrical cables 460 may be inserted into the sheath of the cable assembly 450 on both sides of the flexible chain. This cable assembly 450 may be substantially similar to the cable assembly 450 shown in FIG. 5. The cable assembly 450 may then allow for the electrical cables 460 to transmit electrical signals and/or data while the flexible chain, which comprises the plurality of assemblies 200 and the support wires or cables 110, does not transmit electrical signals and/or data. This may allow for a cable assembly 450 which can flex while still maintaining sufficient support for the electrical cables 460. The flexible chain and the electrical cables 460 may be inserted into the sheath when there already flexible chains and/or electrical cables 460 within the sheath. That is to say, there may be multiple flexible chains and multiple electrical cables 460 within a single sheath. In the above, a sheath is described. However, the sheath may alternatively be a sleeve.

No doubt many other effective alternatives will occur to the skilled person. It will be understood that the invention is not limited to the described embodiments and encompasses modifications apparent to those skilled in the art and lying within the scope of the claims appended hereto.

The invention claimed is:

1. An assembly for supporting an electrical cable comprising:

a first piece comprising a first hole, and a second piece comprising a second hole, wherein the first hole and the second hole are configured to be aligned with one another, wherein the first hole and the second hole are configured to accept a screw and/or a nut for securely coupling the first piece and the second piece to one another, and wherein the second piece further comprises a protrusion configured to interact with at least a section of the first piece, wherein the protrusion and the section of the first piece are configured to temporarily couple the first piece and the second piece to one another before the screw is inserted into the first hole and the second hole, wherein only the second piece comprises a channel configured to hold a non-electrical support wire, wherein the non-electrical support wire is configured to be placed into the channel and be clamped between the first piece and the second piece while the first piece and the second piece are temporarily coupled to one another wherein the assembly is one of a plurality of assemblies configured to be coupled to one another such that the electrical cable is enclosed and continuously supported by the plurality of assemblies from a first assembly of the plurality of assemblies to a last assembly of the plurality of assemblies, wherein the plurality of assemblies is configured to support the electrical cable along a longitudinal axis of the electrical cable, wherein the electrical cable is inserted into the assembly after the coupling of the plurality of assemblies, and wherein a longitudinal axis of the non-electrical support wire and the longitudinal axis of the electrical cable are substantially parallel to one another.

2. The assembly of claim 1, wherein the first piece further comprises a first plurality of elongated members, wherein the first plurality of elongated members are situated on a plane perpendicular to the longitudinal axis of the first hole.

3. The assembly of claim 2, wherein at least a first one of the first plurality of elongated members is positioned on a first side of the first piece and at least a second one of the first plurality of elongated members is positioned on a second side of the first piece, wherein the first side and the second side are opposite sides of the first piece.

4. The assembly of claim 2, wherein the first plurality of elongated members on the first piece are configured to interact with a second plurality of elongated members on a third piece, wherein the first piece and the third piece are substantially similar, and wherein the third piece is part of a second assembly.

5. The assembly of claim 3, wherein a first number of the first plurality of elongated members extending from the first side of the first piece is one more than a second number of the first plurality of elongated members extending from the second side of the first piece.

6. The assembly of claim 2, wherein the plurality of assemblies are configured to be coupled in a substantially linear direction via the first plurality of elongated members.

7. The assembly of claim 2, wherein the plurality of assemblies are configured to flex in a longitudinal axis of the plurality of assemblies via the first plurality of elongated members.

8. The assembly of claim 1, wherein the non-electrical support wire engages both the first piece and the second piece so as to be clamped therebetween within the channel.

9. The assembly of claim 8, wherein the non-electrical support wire is configured to be clamped between a surface defining the channel and a planar surface of the first piece.

10. A method for supporting an electrical cable comprising:

a first piece comprising a first hole, and a second piece comprising a second hole, wherein the method comprises aligning the first hole and the second hole with one another, wherein temporarily coupling the first piece and the second piece via a protrusion on the second piece, wherein the protrusion and at least a section of the first piece are configured to interact with one another, securely coupling the first piece and the second piece to one another by inserting a screw and/or a nut into the first hole and the second hole to form an assembly, wherein only the second piece comprises a channel configured to hold a non-electrical support wire, the method further comprising:

placing the non-electrical support wire in the channel and clamping the non-electrical support wire between the first piece and the second piece during the temporary coupling of the first piece and the second piece, wherein the assembly is one of a plurality of assemblies configured to be coupled to one another such that the electrical cable is enclosed and continuously supported by the plurality of assemblies from a first assembly of the plurality of assemblies to a last assembly of the plurality of assemblies, wherein the plurality of assemblies is configured to support the electrical cable along a longitudinal axis of the electrical cable, wherein the electrical cable is inserted into the assembly after the coupling of the plurality of assemblies, and wherein a longitudinal axis of the non-electrical support wire and the longitudinal axis of the electrical cable are substantially parallel to one another.

11. The method of claim 10, wherein the first piece further comprises a first plurality of elongated members, wherein the first plurality of elongated members are situated on a plane perpendicular to the longitudinal axis of the first hole.

12. The method of claim 11, wherein at least a first one of the first plurality of elongated members is positioned on a first side of the first piece and at least a second one of the first plurality of elongated members is positioned on a second side of the first piece, wherein the first side and the second side are opposite sides of the first piece.

13. The method of claim 11, wherein the method further comprises coupling the plurality of assemblies in a substantially linear direction via the first plurality of elongated members.

14. The method of claim 10, wherein the non-electrical support wire engages both the first piece and the second piece so as to be clamped therebetween within the channel.

15. The method of claim 14, wherein the non-electrical support wire is configured to be clamped between a surface defining the channel and a planar surface of the first piece.

* * * * *